Feb. 11, 1969  J. B. VAN DER WINDEN  3,426,616
ECCENTRIC SHAFT AND PLUNGER PUMP PROVIDED WITH SUCH A SHAFT
Filed Aug. 31, 1966

United States Patent Office 3,426,616
Patented Feb. 11, 1969

3,426,616
ECCENTRIC SHAFT AND PLUNGER PUMP PROVIDED WITH SUCH A SHAFT
Johannes Bernardus van der Winden, Amstelveen, Netherlands, assignor to Gebr. Stork & Co's Apparatenfabriek N.V., Amsterdam, Netherlands
Filed Aug. 31, 1966, Ser. No. 576,442
Claims priority, application Netherlands, Sept. 8, 1965, 6511694
U.S. Cl. 74—571
Int. Cl. G05g 3/00
3 Claims

ABSTRACT OF THE DISCLOSURE

A sectional eccentric shaft for a pump, the shaft being composed of a number of annular eccentric slidably fitted on a core and secured together as a unitary assembly by tension bolts passing through the eccentrics outside the core and pressing the adjacent eccentrics against each other.

My invention relates to an eccentric shaft having a cylindrical core with a number of eccentrics mounted thereon and secured in respect of one another. As compared with a conventional eccentric shaft, that is to say an eccentric shaft manufactured by turning on a lathe, this type of composite eccentric shaft is intended to permit cheaper production and a more compact arrangement.

A considerable disadvantage of the known composite eccentric shaft is, however, that owing to the great forces produced, a certain deflection cannot be avoided. This deflection gives rise to a considerable wear and tear of the sliding bearings of the driving rods associated with the outer ones of the juxtaposed eccentrics, since when the shaft is deflected these eccentrics are subject to the greatest angular distortion. It should be taken into account that the ends of the eccentric shaft are mostly supported in so called self-adjusting bearings.

It is an object of the invetnion to provide an eccentric shaft of the aforementioned type in which the deflection is limited to a minimum value such that the objectionable irregular wear and tear in the sliding bearings of the driving rods is not produced.

A further object of the invention is to develop a resistance in a plane passing through the axis of the eccentric shaft which counteracts any deflection. When the resistance is constituted as axial pressure produced on the various eccentrics, the pressure will have a value such that, at the most unfavorably located location of the eccentric shaft, a positive pressure force is always maintained between each pair of adjacent eccentrics, whereby it is ensured that the deflection of the eccentric shaft is practically nil and that therefore also the tilting or angular distortion of the various eccentrics will be a minimum.

The foregoing and other objects and advantages of the invention will appear in the description to follow. In the description reference is made to the accompanying drawings, which form a part hereof, and in which there is shown by way of illustration and not of limitation a specific form in which the invention may be embodied.

Figure 1:
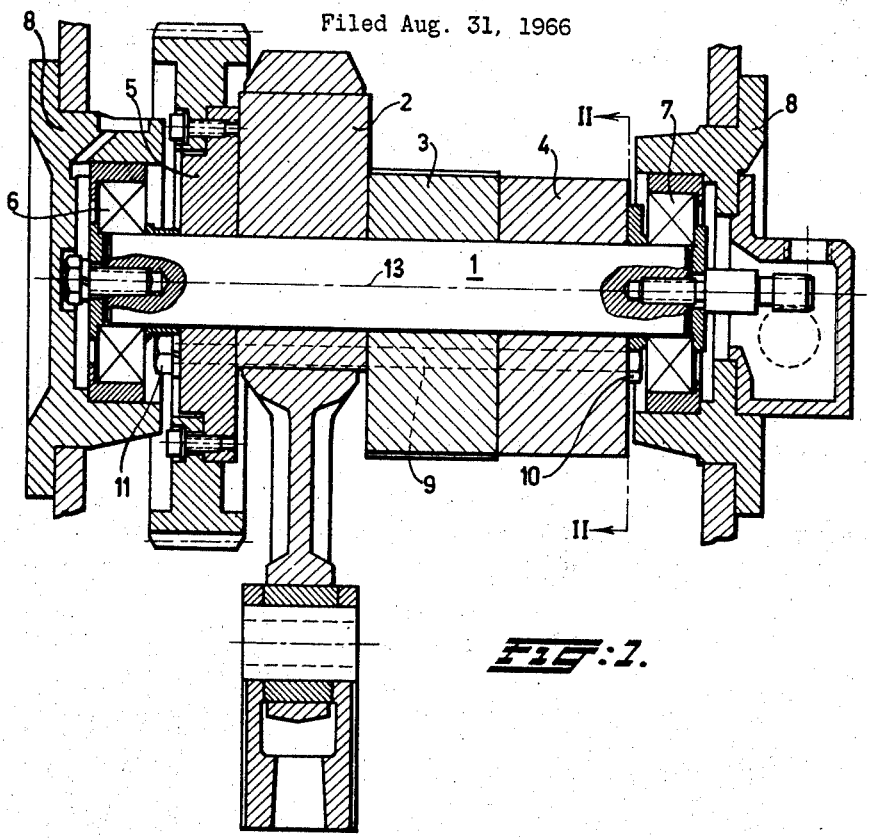
Figure 2:
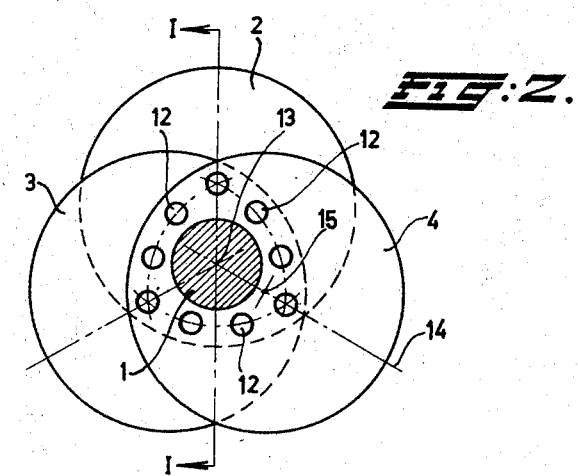

In the drawings:
FIG. 1 is a longitudinal sectional view of an eccentric shaft according to the invention.
FIG. 2 is a cross section on an enlarged scale taken along the line II—II in FIG. 1.

As is visible in FIG. 1 the eccentric shaft consists of a cylindrical core 1 with three eccentrics 2, 3 and 4 thereon. Disposed beside the eccentric 2 is a gear wheel 5, the ends of the core 1 being supported in bearings 6 and 7 respectively, which are supported in a housing 8 (only partially shown) of a plunger pump (not further shown).

The eccentric shaft comprises means for maintaining an axial pressure between the juxtaposed eccentrics 2–4. These means comprise nine draw members consisting of bolts 9, which at one end are provided with a head 10 and at the other end with a nut 11. The said means consist therefore of these parts 9–11.

The draw members or bolts 9 protrude through recesses 12 in the eccentrics 2–4 and in the gear wheel 5. As is apparent from FIG. 1, the draw members 9 are parallel to the center line 13 of the core 1. According to the depicted embodiment, the recesses 12 consist of holes with a diameter which is greater than the diameter of the bolts 9.

From the view point of manufacture it is advantageous that the recesses in the eccentrics be holes with a diameter greater than the thickness of the bolts, since the correct position of these holes need not be determined too exactly when they are drilled and after a provisional mounting the required relative angular position between the consecutive eccentrics can be adjusted with the aid of adjusting gauges, whereupon the eccentrics are finally locked by tightening the nuts on the bolts.

The number of draw members 9 is three times as large as the number of eccentrics 2–4 on the core 1. In this ratio, the draw members may be thinner than when only three draw members are employed. A limitation of the thickness of these draw members is important in connection with the required minimum quantity of material at the location of the narrowest part of each eccentric.

The importance of this matter is best illustrated in FIG. 2. The smallest part of each eccentric is formed by the area situated on either side of the prolongation of the connecting line 14 between the center 15 of the eccentric 4 and the center 13 of the core 1. The recesses 12 situated in the narrowest part of the eccentric are symmetrically provided on either side of the line 14, so that the narrowest part is weakened in the least possible way. In the embodiment as represented in the drawing, the recesses 12 are situated on three arcs, which is concentric with a respective one of the eccentrics 2–4. On each arc are four recesses 12, as is shown FIG. 2.

The embodiment comprising a number of eccentrics and a gear wheel has the special advantage that the gear wheel need no longer be secured on the cylindrical core, e.g., by means of a key groove, since the eccentrics together with the gear wheel constitute an integral assembly. Both the eccentrics and the gear wheel can be fittingly slid on the core. The core itself is not subjected to tensile stress and serves exclusively as a centering and carrying member for the eccentrics and the gear wheel.

It should be noted that the invention can also be applied to an eccentric shaft with more than three eccentrics. In such case, at least as many draw members 9 should be provided as there are eccentrics, but preferably a multiple thereof should be employed.

The advantages of the eccentric shaft according to the invention can be summarized as follows:
An economical use of material, since turning is no longer necessary;
A compact structure is obtained, since the entire running surface of each eccentric can be utilized;
The use of inexpensive cast iron for the eccentrics and for the sliding bearings of the driving rods cooperating therewith becomes possible, which implies also a simplification of the lubrication problems;
An economical production since practically no exact machining is required;
There is no need to employ divided driving rod bearings;
The load of the cylindrical core (the shaft proper) has to a great extent become more favorable, so that less expensive material can also be used therefor.

While preferred embodiments of the invention have been shown and described, it is to be understood that changes and variations may be made without departing from the spirit and scope of the invention as defined in the appended claims.

What I claim is:

1. An eccentric shaft assembly comprising a cylindrical core, a plurality of juxtaposed flat solid eccentrics slidably mounted on said core, bolts disposed outside the core for maintaining an axial pressure between said eccentrics, said bolts passing through bores provided in the eccentrics and extending parallel to the axis of the core, the number of bolts being a multiple of the number of eccentrics, the bores in the narrowest part of each eccentric being symmetrically situated on either side of a line connecting the center of the eccentric with the center of the core.

2. An eccentric shaft assembly according to claim 1, wherein the eccentrics are three in number angularly oriented at 120° with respect to one another and the draw bolts are nine in number, four draw bolts being situated on respective arcs which are concentric with the circumference of associated eccentrics.

3. An eccentric shaft assembly according to claim 2 comprising a gear mounted loosely on said shaft and clamped to said eccentrics by said draw members to form a unitary rotating assembly with said eccentrics.

References Cited

UNITED STATES PATENTS

| | | | |
|---|---|---|---|
| 662,015 | 11/1900 | Noyes | 74—570 XR |
| 2,473,417 | 6/1949 | Essl | 74—568 |
| 1,512,034 | 10/1924 | Luitwieler | 74—567 |

FRED M. MATTERN, JR., *Primary Examiner.*

U.S. Cl. X.R.

74—598